United States Patent Office 3,466,194
Patented Sept. 9, 1969

3,466,194
BATTERY HAVING LEAD DIOXIDE CATHODE, MAGNESIUM OR ZINC ANODE, AND POTASSIUM ACID SULFATE ELECTROLYTE
Joseph C. Duddy, Trevose, Pa., assignor to ESB Incorporated, a corporation of Delaware
Filed Aug. 29, 1967, Ser. No. 664,070
Int. Cl. H01m 17/00, 11/00
U.S. Cl. 136—26                    6 Claims

ABSTRACT OF THE DISCLOSURE

A battery having a lead dioxide cathode, a magnesium or zinc anode, and a potassium acid sulfate ($KHSO_4$) electrolyte. In the preferred embodiment the $KHSO_4$ is impregnated in the separator between the electrodes and the battery may be used as a reserve cell which may be instantly activated with the addition of water.

Cross-references to related applications

This application is related to the following others:
(1) "Seawater Reserve Battery Having Magnesium Anode and Lead Dioxide-Graphite Fabric Cathode," Ser. No. 663,975, by Joseph C. Duddy filed simultaneously with this application.
(2) "Battery Electrodes for Use in Water Electrolyte," Ser. No. 529,208, by Joseph C. Duddy filed Feb. 23, 1966.
All three applications are by the same inventor and have common ownership.

Background of the invention

Among the desired characteristics of a reserve battery are (1) high voltage, (2) low cost, and (3) easy activation, preferably by the addition of water only. Several water activated reserve batteries have been commercially available for some time, but they have failed to combine both high voltage with low cost.

One such previous battery employs silver chloride and magnesium electrodes. This battery provides a relatively high voltage and may be easily activated by immersion in seawater; if fresh water is added, the battery may contain an internal salt deposit which creates the desired electrolyte when water is added. The cell suffers from the disadvantage that the cost of one of its components, silver, is high and going higher.

In searching for less expensive alternates to silver chloride, the chlorides or oxides of other metals such as copper, lead, and mercury have been tried, but these are either soluble in water, produce lower voltages, or both. Mercury is not an attractive alternate because, like silver, it is relatively expensive.

One way of coping with the problem of having water soluble active materials is disclosed and claimed in the second of the cross-referenced related applications listed above.

As an indication of the relative voltages obtained by prior reserve batteries, four cells were constructed using magnesium anodes and seawater electrolyte (a solution which contains approximately 3.6% sodium chloride). All four cells were discharged under a load of 1.30 ohms and otherwise comparable conditions. The cell containing a lead chloride anode produced approximately 0.96 volt. The cell containing a cuprous chloride anode produced approximately 1.51 volts. The cell containing a silver chloride anode produced approximately 1.46 volts. The cell containing a mercurous chloride anode produced 1.43 volts.

Summary of the invention

This invention consists of a battery having a lead dioxide cathode, a magnesium or zinc anode, and a potassium acid sulfate ($KHSO_4$) electrolyte. In the preferred embodiment the $KHSO_4$ is impregnated in the separator between the electrodes and the battery may be used as a reserve cell which may be instantly activated with the addition of water. Due to the relatively low cost of lead dioxide, $PbO_2$, the cell is relatively inexpensive. When activated with water, the preferred embodiment delivers over two volts for periods exceeding 15 minutes.

Description of the preferred embodiment

While the battery of this invention may be constructed so that it is activated by adding a previously prepared $KHSO_4$ solution to a $PbO_2$ cathode and an Mg or Zn anode, it is preferred to impregnate a separator between the electrodes with $KHSO_4$ so that the battery may be activated by the addition of only water. The preferred construction has the advantage of resulting in a reserve type battery which can be easily and inexpensively activated. By properly impregnating the separator so that the $KHSO_4$ impregnation is nearer the $PbO_2$ than the anode, an electrolyte having an acidity gradient is obtained when water is introduced; it is desirable to have a more acidic electrolyte in the vicinity of the $PbO_2$ than exists in the vicinity of the anode, since magnesium is highly and spontaneously reactive in highly acidic solutions.

Figure 1:
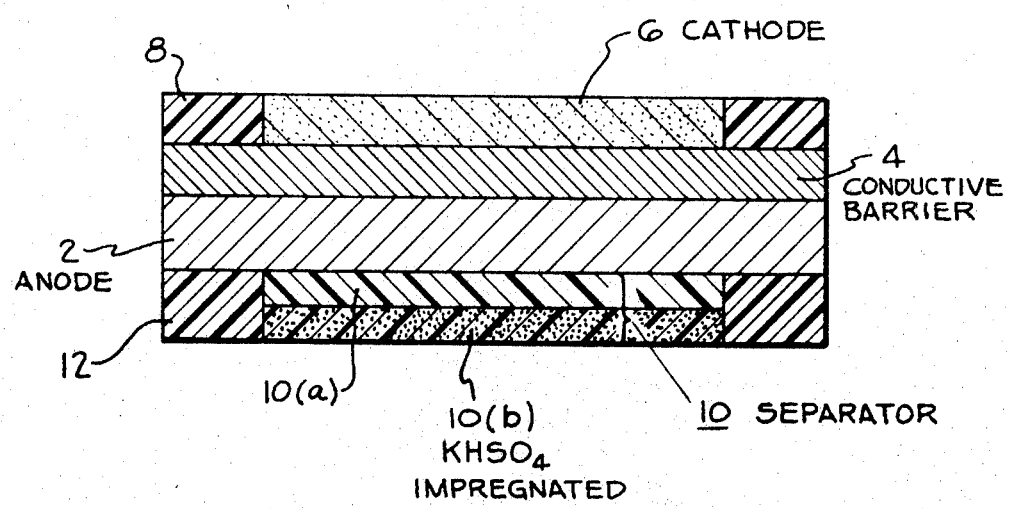
FIGURE 1 shows one mode of construction of one cell if a multicell battery is to be constructed according to this invention.

FIGURE 1 shows one mode of construction of one cell if a multicell battery is to be constructed. It will be apparent that to construct a multicell battery, such cells need only be stacked together. The magnesium or zinc anode 2 may have a conductive barrier 4, preferably of carbon-resin composition, applied to one of its sides, the resulting combination being known in the industry as a duplex or bipolar element. (U.S. Patent No. 3,400,020 entitled "Carbon-Coated Duplex Electrode and Process for Making the Same," issued on Sept. 3, 1968 to Joseph O. Carpino, Joseph C. Duddy, and Martin H. Johnson, discloses one method of constructing such a duplex or bipolar electrode.) On the side of the conductive barrier 4 opposite the anode 2 is the lead dioxide cathode 6 which may conveniently be contained in a washer 8 made from some inert, nonconductive, and impermeable material such as polyvinylchloride. Next to the side of the anode 2 opposite the conductive barrier 4 is the separator 10, which may also be conveniently contained in a washer 12 made from some inert, nonconductive, and impermeable material such as polyvinylchloride. Preferably the separator 10 consists of two layers, 10(a) and 10(b), with the layer nearer the anode, 10(a), not being impregnated with KHSO₄ and the layer farther from the anode containing an impregnation of KHSO₄. The separator material should be highly porous and capable of retaining acidic substances; materials such as polyethylene, filter grade glass fiber, and Fibrite redwood fiber mat are suitable, with polyethylene being particularly preferred for layer 10(b) due to its greater resistance to attack by acids or acidic salts. (One method of producing a highly porous polyethylene material suitable for use in this invention as the separator 10 is disclosed and claimed in "A Method for Preparing a Microporous Thermoplastic Resin Material," U.S. Patent 3,375,208 issued on Mar. 26, 1968 to Joseph C. Duddy.) The separator layer 10(b) may conveniently be impregnated using a saturated aqueous solution of KHSO₄, following which the water is removed.

It will be apparent from an inspection of FIGURE 1 that if two or more such cells are stacked together, the separator 10 will be between tthe anode 2 and the cathode 6, and furthermore the KHSO₄ impregnated layer 10(b) will be nearer the cathode 6 than the other layer, 10(a), of the separator 10 will be.

Figure 2:
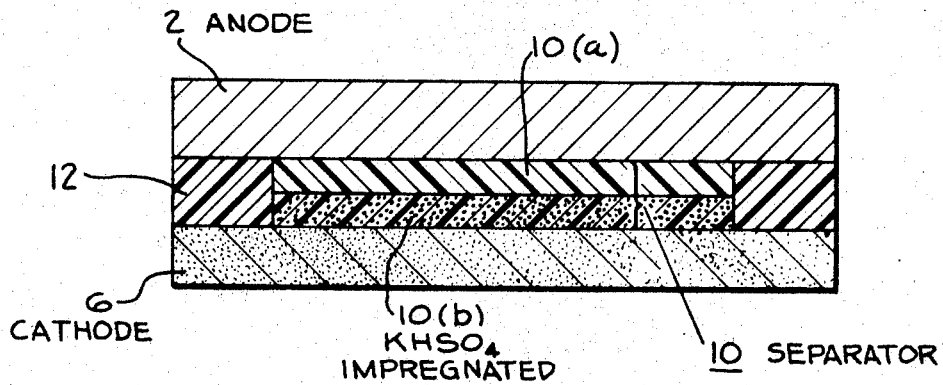
FIGURE 2 shows one mode of construction in a single cell battery constructed according to this invention.

If a single cell battery is desired, the construction shown in FIGURE 1 may be used, but the construction shown in FIGURE 2 would be preferred since there would be no need for the conductive barrier 4 in this instance.

To illustrate the utility of this invention, two cells of the type illustrated in FIGURE 1 were constructed, using lead dioxide obtained from formed positive active material from an automobile battery electrode and pressed into a powder pellet. In the first battery the anode was magnesium while in the second battery the anode was zinc. The separator material was porous polyethylene in both layers. The results of the discharges when water was added were as follows:

| Time from activation, minutes | Cell No. 1, Mg, (current drain=57 ma./sq. in.), volts | Cell No. 2, Zn, (current drain=28.5 ma./sq. in.), volts |
|---|---|---|
| Instantaneous | 2.97 | 2.20 |
| 2 | 2.87 | 2.17 |
| 4 | 2.70 | 2.14 |
| 6 | 2.25 | 2.07 |
| 8 | | 1.94 |
| 10 | | 1.80 |

A third and a fourth cell of thte type illustrated in FIGURE 1 were tested using a commercially available form of lead dioxide which was applied inside the washer 8 in the form of a paste. The paste was made by mixing the lead dioxide powder with an aqueous KHSO₄ solution (saturated at 175° F.) to arrive at a workable consistency. After the washer cavity was filled a mat of filter grade glass fiber was laid on the wet paste surface and the paste was momentarily pressed at 100 p.s.i. The duplex electrode with the PbO₂ paste was then heated at 140° F. until the PbO₂ was dry. In the third cell the anode was magnesium while in the fourth cell the anode was zinc. The separator material was porous polyethylene in both layers. The results of the discharges when water was added were as follows:

| Time from activation, minutes | Cell No. 3, Mg, (current drain=57 ma./sq. in.), volts | Cell No. 4, Zn, (current drain=57 ma./sq. in.), volts |
|---|---|---|
| Instantaneous | 2.80 | 2.20 |
| 2 | 2.97 | 2.21 |
| 4 | 2.93 | 2.22 |
| 6 | 2.88 | 2.22 |
| 8 | 2.82 | 2.21 |
| 10 | 2.80 | 2.17 |
| 12 | 2.78 | 2.12 |
| 14 | 2.76 | 2.08 |

In both the second and the fourth units the cells were recharged after the first discharge and were subsequently discharged a second time. The results indicate a degree of reversibility for the zinc systems.

The first of the cross-referenced related applications listed above discloses and claims a reserve battery having a magnesium anode and a cathode consisting of a lead dioxide deposit on a graphite fabric substrate. The electrolyte is seawater.

I claim:
1. A battery having a lead dioxide cathode, a magnesium anode, and an electrolyte of potassium acid sulfate.
2. A battery having a lead dioxide cathode, a magnesium anode, a separator between the cathode and anode, and an impregnation of potassium acid sulfate within the separator.
3. The battery of claim 2 in which the separator consists of two layers, with the impregnation of potassium acid sulfate being in the layer nearer the cathode.
4. A battery having a lead dioxide cathode, a zinc anode, and an electrolyte of potassium acid sulfate.
5. A battery having a lead dioxide cathode, a zinc anode, a separator between the cathode and anode, and an impregnation of potassium acid sulfate within the separator.
6. The battery of claim 5 in which the separator consists of two layers, with the impregnation of potassium acid sulfate being in the layer nearer the cathode.

References Cited

UNITED STATES PATENTS

| | | | |
|---|---|---|---|
| 637,071 | 11/1899 | Blumenberg | 136—153 |
| 2,472,379 | 6/1949 | Lawson | 136—154 |
| 2,612,537 | 9/1952 | Blake. | |
| 2,678,343 | 5/1954 | Daniel | 136—26 |
| 2,684,988 | 7/1954 | Wilburn. | |
| 3,379,574 | 4/1968 | Gruike et al. | 136—90 |

WINSTON A. DOUGLAS, Primary Examiner

C. F. LEFEVOUR, Assistant Examiner

U.S. Cl. X.R.

136—30, 100, 102, 153